(12) United States Patent
Nakajima et al.

(10) Patent No.: US 7,876,991 B2
(45) Date of Patent: Jan. 25, 2011

(54) OPTICAL FIBER

(75) Inventors: Yasuo Nakajima, Tokyo (JP); Kouji Mochizuki, Tokyo (JP); Hiroki Tanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 104 days.

(21) Appl. No.: 12/235,123

(22) Filed: Sep. 22, 2008

(65) Prior Publication Data
US 2009/0022461 A1    Jan. 22, 2009

Related U.S. Application Data

(63) Continuation of application No. PCT/JP2008/054150, filed on Mar. 7, 2008.

(30) Foreign Application Priority Data

Mar. 8, 2007    (JP) .............................. 2007-058833

(51) Int. Cl.
*G02B 6/02* (2006.01)
(52) U.S. Cl. ...................... 385/128; 385/123; 385/126; 385/127
(58) Field of Classification Search ................ 385/123, 385/126, 127, 128
See application file for complete search history.

(56) References Cited

U.S. PATENT DOCUMENTS 6,028,976 A * 2/2000 Sato et al. ................... 385/114
6,612,134 B1 * 9/2003 Shimoda et al. ............... 65/430
2008/0112676 A1 5/2008 Nakajima et al.

FOREIGN PATENT DOCUMENTS

| JP | 2000-275483 | 10/2000 |
|---|---|---|
| JP | 2006-11309 | 1/2006 |
| JP | 2006-113103 | 4/2006 |

OTHER PUBLICATIONS

U.S. Appl. No. 12/626,814, filed Nov. 27, 2009, Nakajima, et al.
Hong-Ling Li, et al., Estimation of Free Volume in Polymers by Positron Annihilation Lifetime Technique', (1998), pp. 37-46 (with English translation of Abstract).
N. Akasaka, et al., "Design of Optical Fiber Coating", ACOFT 94 (1994), pp. 375-378.
U.S. Appl. No. 12/770,807, filed Apr. 30, 2010, Nakajima, et al.

* cited by examiner

*Primary Examiner*—Jennifer Doan
(74) *Attorney, Agent, or Firm*—Oblon, Spivak, McClelland, Maier & Neustadt, L.L.P.

(57) ABSTRACT

An optical fiber which reduces transmission loss increase even in a high humidity environment or under water is provided. To solve the above issue, an optical fiber according to the present invention comprises a glass optical fiber coated with at least two coating layers, soft and hard layers. The optical fiber is further coated by a colored resin to make a colored optical fiber. The hard layer and the color layer of the colored optical fiber have a free volume radius of at least 0.290 nm according to positron annihilation lifetime spectroscopy.

15 Claims, 2 Drawing Sheets

OPTICAL FIBER

CROSS-REFERENCES TO RELATED APPLICATIONS

This application is a continuation application of International Application No. PCT/JP2008/054150, filed on Mar. 7, 2008, the entire contents of which are incorporated by reference herein.

This application also claims the benefit of priority from Japanese Patent Application No. 2007-058833 filed Mar. 8, 2007, the entire contents of which is incorporated herein by reference.

TECHNICAL FIELD

The present invention relates to an optical fiber to be placed within an optical fiber cable, and more particularly to an optical fiber having reduced transmission loss increase due to surrounding environment and/or aging. In particular, the present invention relates to a water-resistant optical fiber that does not increase transmission loss for a long period of time even when the optical fiber is placed in a high humidity environment or under water.

BACKGROUND OF THE INVENTION

When an optical fiber is drawn from silica glass in an optical fiber manufacturing process, the circumference of the freshly drawn optical fiber is immediately coated with a coating resin. Mainly, ultraviolet (UV) coating resin is used as the coating resin for an optical fiber. Urethane acrylate series or epoxy acrylate series are used for the UV coating resin.

An optical fiber increases its transmission loss due to various stresses and/or micro-bends caused by those stresses. To protect an optical fiber from such stresses, a conventional optical fiber is coated with two layers of coatings; a soft inner layer and a hard outer layer. For the inner layer, which contacts with a silica glass, a relatively lower Young's modules coating is used as a buffer layer (called primary layer hereafter). For the outer layer, a relatively higher Young's modules coating is used as a protective layer (called secondary layer hereafter). For a conventional optical fiber, a resin with Young's modules below 3 MPa is used for the primary layer and a resin with Young's module above 500 MPa is used for the secondary layer.

In general, optical fiber drawing process is performed by heating a perform, which is mainly made of silica, by a furnace, then a drawn fused silica fiber is coated with liquid UV coating resin using a coating die and exposing the coated fiber to UV light to harden the UV coating resin to form the primary and the secondary layers. The structure of the optical fiber is shown in FIG. 1.

Furthermore, in the next process, a colored optical fiber is made by coating an additional coating layer such as a colored resin onto the optical fiber.

When such optical fiber is placed under water, sometimes transmission loss increases. There have been various suggestions to create a highly reliable optical fiber by reducing the transmission loss increase even when the fiber is placed under water for a long period of time such as improving adhesive force between the primary layer and a glass optical fiber.

DISCLOSURE OF INVENTION

Problem to be Solved by the Invention

Recently, as optical fibers are becoming more popular, the number of applications for optical fiber cables is increasing. This means that the environments where optical fiber cables are used are becoming more diversified and, furthermore, new cable structures are also developed. Thus, the requirement for long term reliability in optical fiber cables becomes harder to meet.

Because of such situations, there have been some investigations to minimize the transmission loss even when the optical fiber is under water. However, there are limitations to handle this issue by balancing adherence property of each layer. Current approaches are to design compositions or combination of compositions to prevent water from reaching the fiber or reduce the amount of water that gets into the fiber by investigating cable structure, cord or sheath material. However, these approaches do not offer adequate reliability to the optical fiber cables.

The purpose of the present invention is, for example, to provide an optical fiber to be placed within an optical fiber cable, and more particularly to an optical fiber that reduces optical fiber transmission loss increase due to surrounding environment and/or aging. Especially, the present invention relates to a water-resistant optical fiber, which does not increase transmission loss for a long period of time even the optical fiber is placed in a high humidity environment or under water.

Means for Solving Problem

To solve the above issue, one of the embodiments of the present invention has an optical fiber coated with at least two coating layers, soft and hard coating layers, where the hard coating layer has a free volume radius of at least 0.290 nm according to positron annihilation lifetime spectroscopy.

In another embodiment of the present invention, the optical fiber is further coated with a colored resin to create a colored optical fiber with a color layer, and the color layer has a free volume radius of at least 0.290 nm according to positron annihilation lifetime spectroscopy.

In yet another embodiment of the present invention, multiple colored optical fibers are laid in parallel to one another in a linear array and held together by a ribbon resin to create an optical fiber ribbon.

In all of the embodiments of the present invention, at least the soft and hard layers, the color coating layer (if applicable), and the ribbon layer (if applicable) of the (colored) optical fiber and the optical fiber ribbon are made from UV coating resin.

BRIEF DESCRIPTION OF THE DRAWINGS

Referring now to the drawings.

EXPLANATIONS OF LETTERS OR NUMERALS

Figure 1:
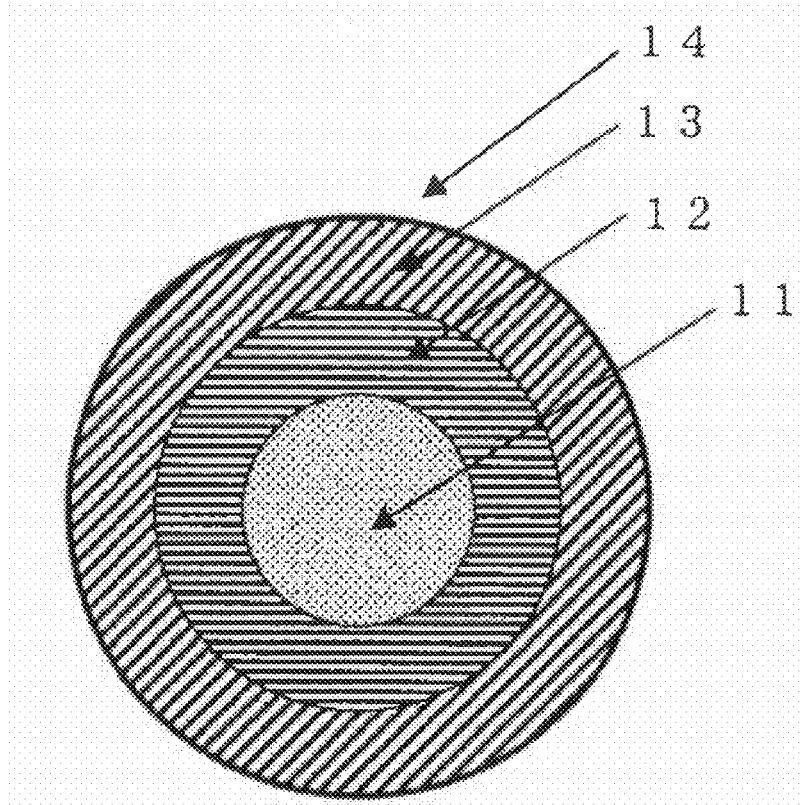
FIG. 1 is a cross section of a (colored) optical fiber according to an embodiment of the present invention.

11 Glass optical fiber
12 Primary layer
13 Secondary layer
14 (Colored) optical fiber
21 Color layer
22 Colored optical fiber
31 Ribbon resin
32 Optical fiber ribbon

BEST MODE(S) FOR CARRYING OUT THE INVENTION

In the following, detailed description of the present invention is explained.

In this application, an optical fiber is defined as a glass optical fiber coated with primary and secondary layers as shown in FIG. 1. A colored optical fiber is defined as the optical fiber having a secondary layer that includes a coloring agent, or the optical fiber is further coated with an additional coating layer such as a colored resin. An optical fiber ribbon is defined as multiple colored optical fibers which are laid in parallel to one another in a linear array and held together by a ribbon resin.

Inventors for the present invention observed that an optical fiber with transmission loss increase has delaminations between a glass optical fiber and a primary layer as a result of keen examinations to find a cause of the transmission loss increase in an optical fiber under water or in a high humidity environment.

Delaminations between the glass optical fiber and the primary layer occur when the force to tear off the coating layer at the interface between the glass optical fiber and the coating layer is stronger than the adhesive force at the interface between them. When delaminations occur at the interface, the force applied to the glass becomes imbalanced. This leads to micro-bends and the micro-bends increase transmission loss.

The mechanism of reduction in adhesive force at the interface between the glass optical fiber and the coating layer when the optical fiber is under water or in a high humidity environment is inferred as follows. When an optical fiber is placed under water or in a high humidity environment, the water passes through the coating layer(s) and it reaches the interface between the glass optical fiber and the coating layer. There is adhesive force at the interface between the glass optical fiber and the coating layer, and according to N. Akasaka et al., "Design of Optical Fiber Coating" Proc. of 19$^{th}$ Australian Conference on Optical Fibre Technology (ACOFT), p. 375, 1994, in general, the adhesive force consists of 1) hydrogen bonds between glass and functional groups in resin, and 2) chemical bonds from adhesive accelerator. However, the hydrogen bonds are broken when the water enters the interface between the glass optical fiber and the coating layer. As stated above, it is inferred that because of the broken hydrogen bonds, the adhesive force between the glass optical fiber and the primary layer is reduced.

To practice the present invention, a glass optical fiber is coated with primary and secondary layers to make an optical fiber. Then, the optical fiber is further coated with a color layer to create a colored optical fiber. Resin for each coating is made from UV coating resin. Depending on the application, multiple (colored) optical fibers are laid in parallel to one another in a linear array and held together by a ribbon resin to create an optical fiber ribbon.

Coating resin and color resin for the optical fiber are made from UV coating resin. Mainly the UV coating comprises of oligomer, diluent monomer, photo-initiator, chain transfer agent, silane coupling agent and various additives. As for the oligomer, urethane acrylate series, epoxy acrylate series, or polyester acrylate series are mainly used. As for the diluent monomer, monofunctional monomers or multifunctional monomers are used.

The colored optical fiber according to the present invention has hard and color layers, each having a free volume radius of at least 0.290 nm according to positron annihilation lifetime spectroscopy at ambient temperature. The colored optical fiber can reduce transmission loss increase. Also, in the view of mechanical characteristics, a free volume radius of 0.35 nm or more is preferred.

Here, positron annihilation lifetime spectroscopy is a method to measure concentration and/or size of holes and/or local voids in a sample material by measuring the time (positron annihilation lifetime) between positron ($e^+$) is injected to the sample and the positron ($e^+$) is annihilated. A positron is the antiparticle of an electron. It is a particle which has the same mass as the electron and positive charge. It is known that when positrons meet with electrons within molecular crystals and/or amorphous material, by Coulomb's force, sometimes those create electron-positron pairs and later annihilate. (Hong-Ling Li, Y. Ujihira, "Estimation of Free Volume in Polymer by Positron Annihilation Lifetime Technique", Bunseki, 1, 11 (1998))

This electron-positron pair acts as particles and the phenomenon is called positronium. In positronium, there are two kind of spins between the electron and the positron; parallel spins known as para-positronium (p-Ps) and antiparallel spins known as ortho-positronium (o-Ps). When a positron is injected into a macromolecule, sometimes the positron ($e^+$) bonds with an electron, which is knocked out from the macromolecule, to create o-Ps. $e^+$ and/or o-Ps are trapped into lower electric density area in the macromolecule, more specifically local voids in the macromolecule. Then, $e^+$ and/or o-Ps overlap with electron cloud from gap wall and annihilate. When $e^+$ and/or o-Ps are in the voids of macromolecule, the size of the voids and annihilation of $e^+$ and/or o-Ps are inversely proportional. More specifically, if the voids are small in size, overlap between $e^+$ and/or o-Ps and surrounding electrons is large, thus positron annihilation lifetime is shorter. On the other hand, if the voids are large in size, probability of $e^+$ and/or o-Ps overlap with other electrons from gap wall decrease, thus positron annihilation lifetime is longer. Consequently, by measuring the $e^+$ and/or o-Ps annihilation lifetime, size of local voids in macromolecule resin can be evaluated.

To measure positron lifetime, radioactive isotope $^{22}$Na is often used as a source for positron. When $^{22}$Na is β decay to $^{22}$Ne, it emits a positron and 1.28 MeV γ ray. When a positron is injected into macromolecule, it emits 511 keV γ ray after annihilation process. Consequently, by setting 1.28 MeV γ ray as a starting signal and 511 keV γ ray as an ending signal, positron annihilation lifetime can be measured from the time lag in between.

EMBODIMENTS OF THE PRESENT INVENTION

As embodiments of the present invention, several optical fibers 14 were created from a glass optical fiber 11 coated with two layers of coating resin; namely, a primary layer 12 and a secondary layer 13 as shown in FIG. 1. The glass fiber 11 is made from silica and UV coating resin was used for the resin in each layer. The UV coating resin comprises of oligomer, diluent monomer, photo-initiator, chain transfer agent and additives. By changing the above composition, several optical fibers 14 were made.

The free volume radius of UV coating resin can be arbitrarily changed by controlling framework geometry and molecular weight of the oligomer, and type and amount of the accretive diluent monomer. In addition, in many times, by increasing the molecular weight of oligomer and/or reducing the amount of accretive diluent monomer, the free volume radius can be reduced.

Figure 2:
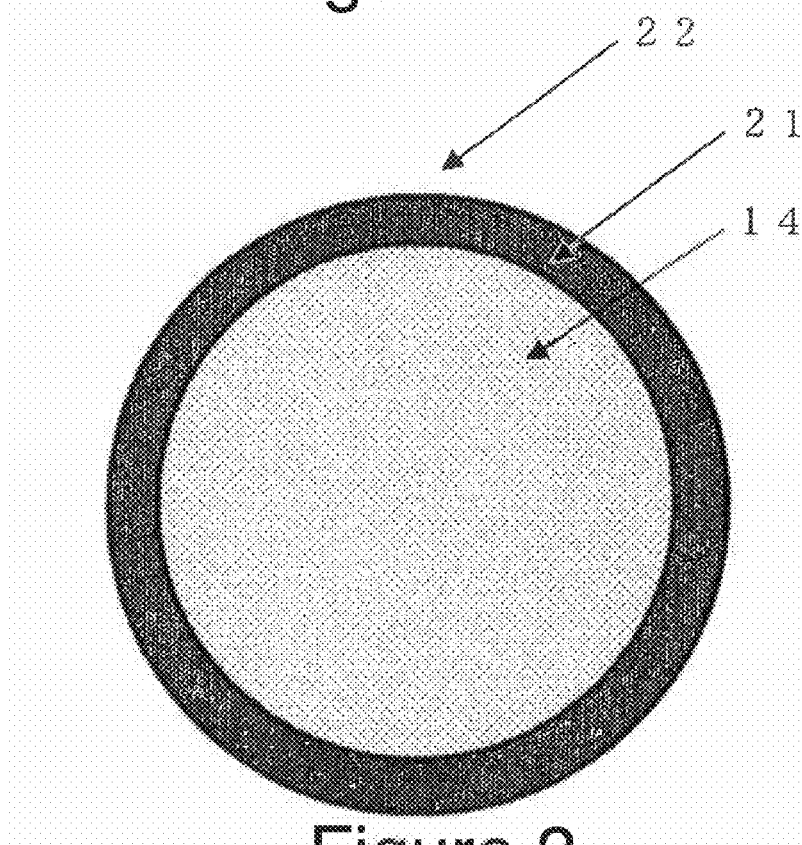
FIG. 2 is a cross section of another optical fiber according to an embodiment of the present invention.

In one embodiment of the present invention, an optical fiber comprises a glass optical fiber 11, a primary layer 12 and a secondary layer 14. The glass fiber 11 is made from silica and has an outer diameter of 125 μm. The primary layer 12 covers the glass fiber 11 and the primary layer 12 has an outer diameter of 185 μm or 195 μm. The secondary layer 13 covers the primary layer 12 and the secondary layer 13 has an outer diameter of 245 μm. Also, colored optical fibers 22 in embodiments 3 and 5, and comparative examples 3, 5 and 7 (shown in FIG. 2) are made by coating a color layer 21 on top of the optical fiber 14 in a separate process. The colored optical fiber 22 has an outer diameter of 255 μm. On the other hand, for the colored optical fiber 14 in embodiment 2 and comparative example 2, a coloring agent is directly put into the secondary layer 13 to make the colored optical fiber 14 with outer diameter of 255 μm. The cross section of the colored optical fiber 14 is shown in FIG. 1.

Figure 3:
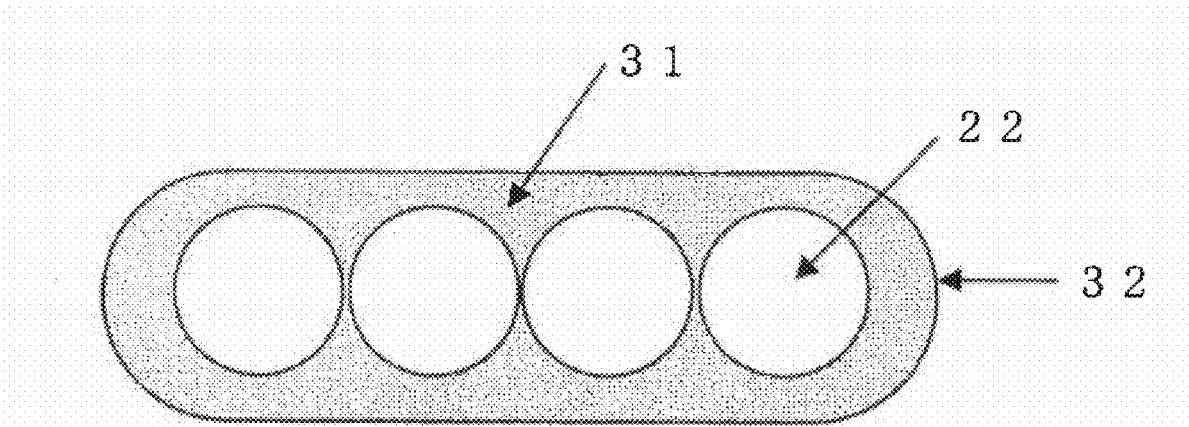
FIG. 3 is a cross section of an optical fiber ribbon according to an embodiment of the present invention.

Furthermore, some of the colored optical fibers 22 are used to make an optical fiber ribbons 32. Four of the colored optical fibers are laid in parallel to one another in sequence in a linear array and held together by ribbon resin which is made from UV coating resin as shown in FIG. 3 to create the optical fiber ribbons 32. For the optical fiber ribbon in embodiment 4, the colored optical fibers in embodiment 3 were used. For the optical fiber ribbon in embodiment 6, the colored optical fibers in embodiment 5 were used. For the optical fiber ribbon in comparative examples 4, 6 and 8, the colored optical fibers in comparative examples 3, 5 and 7 were used respectively.

These fibers and fiber ribbons are tested to measure heat expansion and transmission loss according to the test condition as follows and the results are shown in table 1.

Test Condition:
Radiation source: $^{22}$Na (strength 1.85 MBq)
Measurement time: 5 hours
Positron lifetime analysis: fitting program PATFIT
Condition for analysis: three elements analysis (set value: 0.1, 0.35 and 1 ns)
Free volume distribution analysis: Laplace inversion program of CONTIN
Sample size: 10 mm×10 mm (measured by sandwiching the radiation source with a two-ply sample)

Free volume is measure by positron annihilation lifetime. The free volume radius (in nm) was obtained from the equation below which calculates the free volume radius from $3^{rd}$ element of the positron lifetime value.

$$\tau_3 = 0.5 \times \left[ 1.0 - \frac{R}{R_0} + \frac{1}{2\pi}\sin\left(\frac{2\pi R}{R_0}\right) \right]^{-1}$$

$\tau_3$: o-Ps lifetime(ps)

R: Free volume radius(nm)

$R_0$: $R + \Delta R$ $\Delta R$: 0.166 nm

ΔR is a parameter to show the thickness of electron cloud bleed into the free volume and 0.166 nm is used as a preferred fitting parameter.

(Measurement of Transmission Loss)

About 1 km of the (colored) optical fibers and the optical fiber ribbons in embodiments 1 to 6 and comparative examples 1 to 8 are placed under 60° C. water for 30 days. Then, transmission loss increase in each of the (colored) optical fibers and the optical fiber ribbons is measured. To measure the transmission loss, optical pulse tester MW9060A from Anritsu Corporation was used. The loss at a wavelength of 1.5 μm was measured by Optical Time-domain Reflectometry (OTDR). In this measurement, if the transmission loss increased by more than 0.1 dB/km after the (colored) optical fibers and the optical fiber ribbon which are under 60° C. water for 30 days, it was determined to have no resistance over the environment of usage (in table 1, it was marked as "X"). Furthermore, by observing the tested (colored) optical fibers and the optical fiber ribbons with an optical microscope, delamination section(s) of the (colored) optical fibers (in the optical fiber ribbons) was measured.

TABLE 1

|  | Embodiments ||||||| comparative examples ||||||||
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| Coefficient of elasticity in primary layer (MPa) | 1.4 | 1.4 | 1.0 | 1.0 | 1.4 | 1.4 | 1.4 | 1.4 | 1.0 | 1.0 | 1.4 | 1.4 | 1.0 | 1.0 |
| Coefficient of elasticity in secondary layer (MPa) | 760 | 760 | 500 | 500 | 760 | 760 | 760 | 760 | 500 | 500 | 760 | 760 | 950 | 950 |
| Outer diameter of primary layer (μm) | 195 | 195 | 185 | 185 | 195 | 195 | 195 | 195 | 185 | 185 | 195 | 195 | 195 | 195 |
| Glass transition temperature in | −5 | −5 | −17 | −17 | −5 | −5 | −5 | −5 | −17 | −17 | −5 | −5 | −5 | −5 |

TABLE 1-continued

|  | Embodiments | | | | | | comparative examples | | | | | | | |
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| primary layer (° C.) Glass transition temperature in secondary layer (° C.) | 92 | 92 | 87 | 87 | 92 | 92 | 92 | 92 | 87 | 87 | 92 | 92 | 98 | 98 |
| Free volume radius of hard layer (nm) | 0.293 | 0.293 | 0.293 | 0.293 | 0.293 | 0.293 | 0.283 | 0.283 | 0.293 | 0.293 | 0.293 | 0.283 | 0.283 | 0.283 |
| Free volume radius of color layer (nm) | N/A | N/A | 0.293 | 0.293 | 0.307 | 0.307 | N/A | N/A | 0.283 | 0.283 | 0.283 | 0.283 | 0.293 | 0.293 |
| Status**: when transmission loss was measured | OF | COF | COF | OFR | COF | OFR | OF | COF | COF | OFR | COF | OFR | COF | OFR |
| Increase in transmission loss (dB/km) 60° C. × 30 days, 1.55 μm | 0.0 | 0.0 | 0.0 | 0.0 | 0.0 | 0.0 | 0.1 | 0.1 | 0.2 | 0.4 | 0.3 | 0.5 | 0.3 | 0.3 |
| Delamination | Non | Non | Non | Non | Non | Non | G/P* | G/P* | G/P* | G/P* | G/P* | G/P* | G/P* | G/P* |
| Determination | ○ | ○ | ○ | ○ | ○ | ○ | X | X | X | X | X | X | X | X |

*G/P: delamination between glass and primary layer
**OF: optical fiber, COF: colored optical fiber, OFR: optical fiber ribbon As it is clear from above explanation, according to the (colored) optical fibers and the optical fiber ribbons of the present invention: 1) an optical fiber coated with at least two coating layers, soft and hard coating layers, and the hard coating layer has a free volume radius of at least 0.290 nm according to positron annihilation lifetime spectroscopy; 2) a colored optical fiber which coloring agent is in the hard coating layer and the hard coating layer has a free volume radius of at least 0.290 nm according positron annihilation lifetime spectroscopy; and 3) a colored optical fiber which is made by a coating colored resin to create a color layer onto the optical fiber and the color layer has a free volume radius of at least 0.290 nm (as well as at least 0.290 nm of the free volume radius in the hard layer) according to positron annihilation lifetime spectroscopy, have not increased the transmission loss even if they are under 60° C. water for 30 days. Also, the effect is confirmed to be true for both the colored optical fiber status (embodiments 2, 3 and 5 in table 1) and the optical fiber ribbon status (embodiments 4 and 6). On the other hand, according to the results from comparative examples 1~8, when the free volume radius is less than 290 nm (in the hard layer and/or colored layer), transmission loss increased by 0.1 db/km or more.

Figure 4:
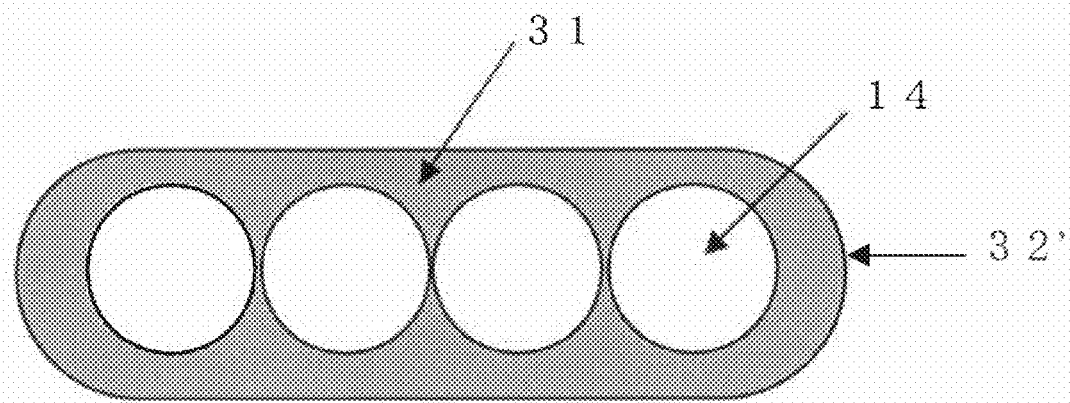
FIG. 4 is a cross section of another optical fiber ribbon according to an embodiment of the present invention.

In the embodiments of the present invention, the colored optical fibers 22 are used to make an optical fiber ribbons 32, but the (colored) optical fibers 14 can also use to make an optical fiber ribbons 32' as shown in FIG. 4.

The embodiments of the present invention use conventional step-index profile single mode fibers, but it is apparent to a person of ordinary skill in the art that the present invention can be applied to optical fibers with other profiles as well.

As described above, according to the present invention, by using a (colored) optical fiber which has a free volume radius of at least 0.290 nm in the hard layer (and in the color layer, if applicable) according to positron annihilation lifetime spectroscopy can reduce transmission loss increase even if the fiber is placed in under water or in a high humidity environment. Also, by using the optical fibers described above, a preferred optical fiber ribbon can be constructed as well.

Furthermore, the (colored) optical fibers and/or the optical fiber ribbons according to the present invention do not increase transmission loss even if they are subject to an environmental and/or temporal change, especially under water or in a high humidity environment.

What is claimed is:

1. An optical fiber comprising:
  a glass optical fiber coated with a plurality of layers including a soft layer and a hard layer, the hard layer having a free volume radius of at least 0.290 nm according to positron annihilation lifetime spectroscopy.

2. The optical fiber of claim 1, wherein the hard layer of the optical fiber includes a coloring agent.

3. The optical fiber of claim 1, wherein the plurality of layers are made from UV coating resin.

4. A colored optical fiber comprising:
  an optical fiber having a glass optical fiber coated with a plurality of layers including a soft layer and a hard layer, the hard layer having a free volume radius of at least 0.290 nm according to positron annihilation lifetime spectroscopy; and
  a coating layer made from a colored resin and coated onto the optical fiber, the coating layer having a free volume radius of at least 0.290 nm according to positron annihilation lifetime spectroscopy.

5. The colored optical fiber of claim 4, wherein the coating layer made from the colored resin is made from UV coating resin.

6. An optical fiber ribbon comprising:
  a plurality of colored optical fibers laid parallel to one another in a linear array and held together by a ribbon resin, the plurality of colored optical fibers having glass optical fibers coated with a plurality of layers including a soft layer and a hard layer, the hard layer having a coloring agent and a free volume radius of at least 0.290 nm according to positron annihilation lifetime spectroscopy.

7. The optical fiber ribbon of claim 6, wherein the ribbon resin is made from UV coating resin.

8. An optical fiber ribbon comprising:
a plurality of colored optical fibers laid parallel to one another in a linear array and held together by a ribbon resin, the plurality of colored optical fibers having glass optical fibers coated with a plurality of layers including a soft layer and a hard layer, the hard layer having a free volume radius of at least 0.290 nm according to positron annihilation lifetime spectroscopy, and
a coating layer made from a colored resin, the coating layer having a free volume radius of at least 0.290 nm according to positron annihilation lifetime spectroscopy.

9. The optical fiber of claim 1, wherein the ribbon resin is made from UV coating resin.

10. The optical fiber of claim 1, wherein the free volume radius of the hard layer is less than 0.350 nm.

11. The colored optical fiber of claim 4, wherein the free volume radius of the hard layer is less than 0.350 nm.

12. The colored optical fiber of claim 4, wherein the free volume radius of the coating layer is less than 0.350 nm.

13. The optical fiber ribbon of claim 6, wherein the free volume radius of the hard layer is less than 0.350 nm.

14. The optical fiber ribbon of claim 8, wherein the free volume radius of the hard layer is less than 0.350 nm.

15. The optical fiber ribbon of claim 8, wherein the free volume radius of the coating layer is less than 0.350 nm.

* * * * *